US012642738B1

(12) United States Patent
Cun

(10) Patent No.: US 12,642,738 B1
(45) Date of Patent: Jun. 2, 2026

(54) MALE MASTURBATOR

(71) Applicant: SHENZHEN ENVISION TECHNOLOGY INNOVATION CO., LTD., Shenzhen (CN)

(72) Inventor: Lang Cun, Shenzhen (CN)

(73) Assignee: SHENZHEN ENVISION TECHNOLOGY INNOVATION CO., LTD., Shenzhen (CN)

( * ) Notice: Subject to any disclaimer, the term of this patent is extended or adjusted under 35 U.S.C. 154(b) by 0 days.

(21) Appl. No.: 19/234,713

(22) Filed: Jun. 11, 2025

(30) Foreign Application Priority Data

May 13, 2025 (CN) ......................... 202520939964.6

(51) Int. Cl.
*A61H 19/00* (2006.01)
*A61H 23/02* (2006.01)

(52) U.S. Cl.
CPC ............ *A61H 19/32* (2013.01); *A61H 23/02* (2013.01); *A61H 2201/1669* (2013.01); *A61H 2201/169* (2013.01); *A61H 2201/5097* (2013.01)

(58) Field of Classification Search
None
See application file for complete search history.

(56) References Cited

U.S. PATENT DOCUMENTS

| | | | | |
|---|---|---|---|---|
| 2021/0196560 | A1* | 7/2021 | Liu | A61H 9/0092 |
| 2023/0116215 | A1* | 4/2023 | Liu | A61H 9/0057 600/38 |
| 2024/0099930 | A1* | 3/2024 | Luo | A61H 7/00 |

FOREIGN PATENT DOCUMENTS

| | | | | |
|---|---|---|---|---|
| DE | 202024103457 U1 * | 7/2024 | | A61H 19/32 |
| DE | 202025100976 U1 * | 4/2025 | | A61H 19/32 |
| WO | WO-2024037373 A1 * | 2/2024 | | A61H 19/00 |

* cited by examiner

*Primary Examiner* — Charles A Marmor, II
*Assistant Examiner* — Marc D. Honrath
(74) *Attorney, Agent, or Firm* — HOWARD M COHN and Associates, LLC

(57) ABSTRACT

A male masturbator includes a sleeve, a flexible piece, a telescopic piece, and a negative pressure driving component. The sleeve defines an accommodating space, a first opening, and a second opening. The first opening and the second opening are disposed along an axial direction of the sleeve and are communicated with the accommodating space. The flexible piece and the telescopic piece are at least partially disposed in the accommodating space. The flexible piece and the telescopic piece are disposed in sequence along the axial direction of the sleeve and toward the second opening. The negative pressure driving component is communicated with the first opening of the sleeve and enables a negative pressure to be formed in the sleeve, so that the flexible piece is driven to move toward the first opening and the telescopic piece is driven to move toward the first opening.

15 Claims, 5 Drawing Sheets

MALE MASTURBATOR

TECHNICAL FIELD

The present disclosure relates to a technical field of sex toys, and in particular to a male masturbator.

BACKGROUND

In order to meet physiological needs of men, a wide variety of sex toys have appeared on the market. Male masturbators are favored by male users because of their portability and compactness. However, conventional portable male masturbators only provide simple vibration massage with relatively simple massage movements, lack of deep soothing of pennies, and have certain limitations in user experience.

SUMMARY

Embodiments of the present disclosure provide a male masturbator. The male masturbator comprises a sleeve, a flexible piece, a telescopic piece, and a negative pressure driving component.

The sleeve defines an accommodating space, a first opening, and a second opening. The first opening and the second opening are defined on two opposite ends of the sleeve along an axial direction thereof. The first opening and the second opening are communicated with the accommodating space. The flexible piece is at least partially disposed in the accommodating space. The telescopic piece is at least partially disposed in the accommodating space. The flexible piece and the telescopic piece are disposed in sequence along the axial direction of the sleeve and toward the second opening. The negative pressure driving component is communicated with the first opening of the sleeve and enables a negative pressure to be formed in the sleeve, so that the flexible piece is driven to move toward the first opening and the telescopic piece is driven to move toward the first opening, thereby proving a comfortable massage experience.

DETAILED DESCRIPTION

Figure 1:
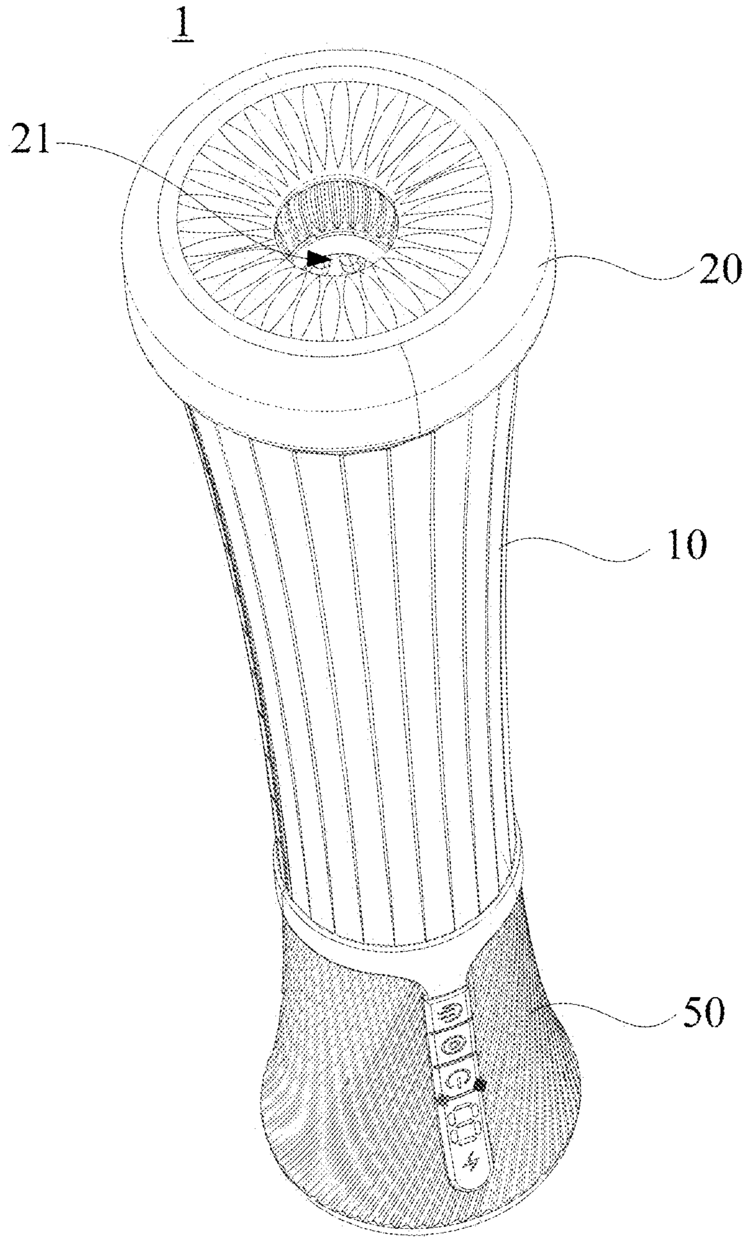
FIG. 1 is a schematic diagram of a male masturbator according to one embodiment of the present disclosure.
Figure 2:
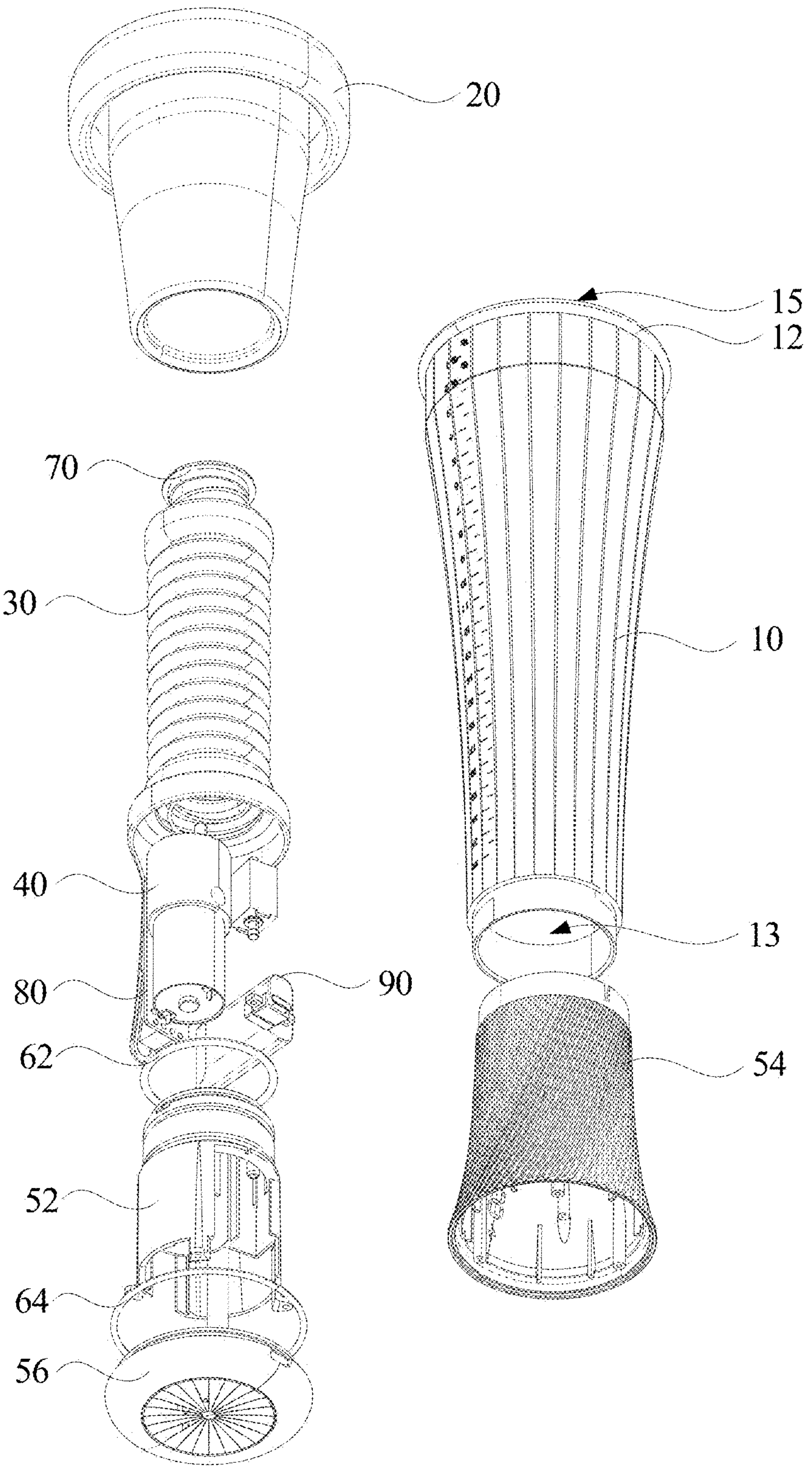
FIG. 2 is an exploded schematic diagram of the male masturbator shown in FIG. 1.

As shown in FIGS. 1 and 2, the present disclosure provides a male masturbator 1. The male masturbator 1 comprises a sleeve 10, a flexible piece 20, a telescopic piece 30, and a negative pressure driving component 40.

Figure 3:
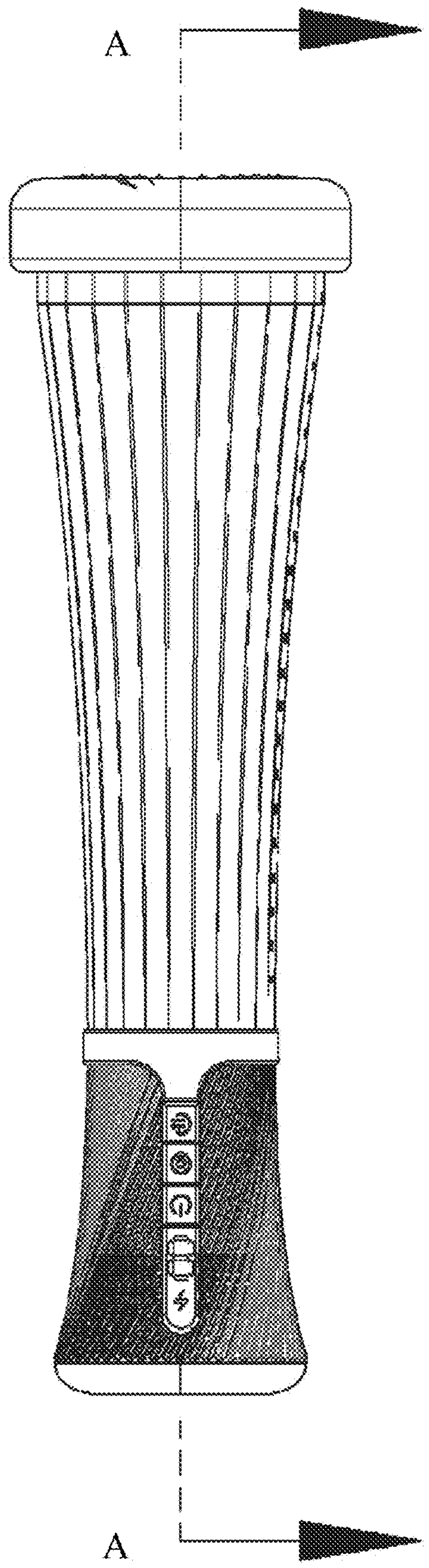
FIG. 3 is another schematic diagram of the male masturbator shown in FIG. 1.
Figure 4:
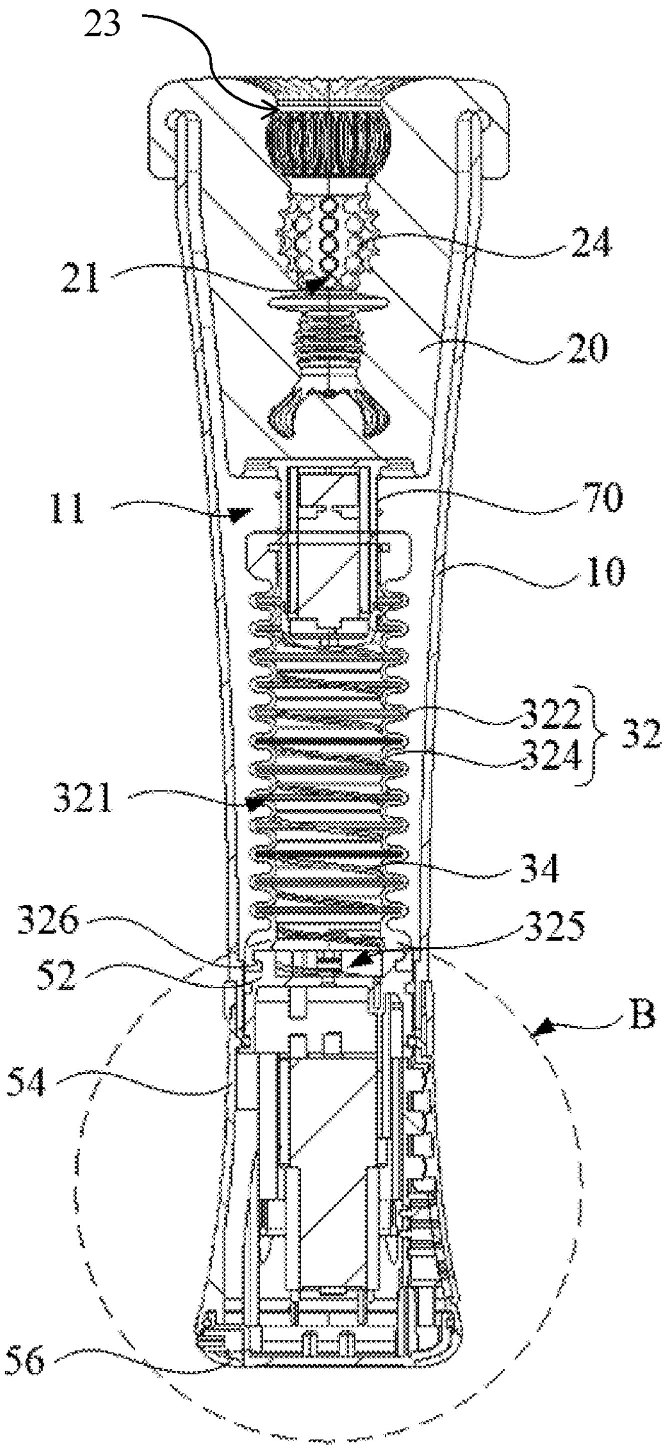
FIG. 4 is a cross-sectional schematic diagram of the male masturbator taken along the line A-A shown in FIG. 3.

As shown in FIGS. 3 and 4, the sleeve 10 define an accommodating space 11, a first opening 13, and a second opening 15. The first opening 13 and the second opening 15 are defined on two opposite ends of the sleeve 10 along an axial direction thereof. The first opening 13 and the second opening 15 are communicated with the accommodating space 11. The flexible piece 20 is at least partially disposed in the accommodating space 11. The telescopic piece 30 is at least partially disposed in the accommodating space 11. The flexible piece 20 and the telescopic piece 30 are disposed in sequence along the axial direction of the sleeve 10 and toward the second opening 15. The negative pressure driving component 40 is communicated with the first opening 13 of the sleeve 10 and enables a negative pressure to be formed in the sleeve, so that the flexible piece 20 is driven to move toward the first opening 13 and the telescopic piece 30 is driven to move toward the first opening 13.

In one embodiment, the flexible piece 20 is made of a flexible material, and is deformed when being subjected to a force. For instance, the flexible piece 20 is extended and in an extended state when under the force, and the flexible piece 20 is restored to an initial state when the force disappears.

In one embodiment, the telescopic piece 30 is deformable, and is deformed when receiving the force, such as being compressed and in a compressed state. The telescopic piece 30 is restored to an extended state when the force disappears.

In one embodiment, the negative pressure driving component 40 is connected to the sleeve 10 through the first opening 13. When the negative pressure driving component 40 is started, the negative pressure is formed in the sleeve 10, causing the flexible piece 20 to move toward the first opening 13 under an action of a pressure difference. The flexible piece 20 being compressed contacts and pushes the telescopic piece 30 to move toward the first opening 13. Namely, the negative pressure driving component 40 directly drives the flexible piece 20 to move toward the first opening 13, and indirectly drives the telescopic piece 30 to move toward the first opening 13 through the flexible piece 20.

When the negative pressure driving component 40 extracts the gas through the first opening 13, an air pressure inside the sleeve 10 decreases to form the negative pressure, and an external atmospheric pressure is greater than the negative pressure, resulting in the pressure difference on two sides of the flexible piece 20. The external atmospheric pressure acts on an outer side of the flexible piece 20 to push a portion of the flexible piece 20 disposed inside the sleeve 10 to deform, and the portion of the flexible piece 20 is deformed to move toward the first opening 13. That is, the portion of the flexible piece 20 moves toward the negative pressure driving component 40, causing a length of the flexible piece 20 to extend in the axial direction, while the flexible piece 20 is compressed inward in the axial direction. Since a position of the flexible piece 20 is limited by the sleeve 10, the flexible piece 20 contracts toward an interior of the sleeve 10, and the flexible piece 20 contracts radially toward the interior of the sleeve 10 when the flexible piece 20 extends toward the first opening 13. When the negative pressure driving component 40 stops working, the flexible piece 20 returns to the initial state due to its own elastic properties, and restores in the axial direction and is expanded in a radial direction until the flexible piece 20 restores to the initial state. For example, when a part to be massaged (such as human fingers and a penis of the user) is placed inside the flexible piece 20 and the negative pressure driving component 40 works, the flexible piece 20 is axially extended and radially contracted, thereby tightly wrapping the part to be massaged inside the flexible piece 20, and the part to be massaged is pulled and squeezed by the flexible piece 20. When the negative pressure driving component 40 stops working, the length of the flexible piece 20 is reduced in the axial direction and a size of the flexible piece expands in the radial direction, and the part to be massaged is convenient to be taken out from the flexible piece 20. The negative pressure driving component 40 is configured to generate a periodically changing negative pressure, and the deformation of the flexible piece 20 is performed periodically, thereby producing a massage effect on the part to be massaged.

In one embodiment, the male masturbator 1 further comprises a vibrating piece 70 disposed in the accommodating space 11 and connected to the telescopic piece 30. When the negative pressure is formed in the sleeve 10, the vibrating piece 70 is connected to the flexible piece 20. Specifically, when the telescopic piece 30, the vibrating piece 70, and the flexible piece 20 are disposed in the sleeve 10, the vibrating piece 70 abuts against one end of the flexible piece 20 away from the second opening 15. The vibrating piece 70 is configured to vibrate and act on the one end of the flexible piece 20 away from the second opening 15.

The vibrating piece 70 is connected to the telescopic piece 30. When the negative pressure is formed in the sleeve 10, the part of the flexible piece 20 disposed in the sleeve 10 is deformed, and the part of the flexible piece 20 moves toward the first opening 13 and abuts against the vibrating piece 70. At this time, the vibrating piece 70 transmits the vibration to the flexible piece 20, and then transmits the vibration to the part to be massaged in the flexible piece 20, thereby enhancing the massage effect of the male masturbator 1 and bringing a rich user experience to the user. During the vibration of the vibrating piece 70, the vibration is further transmitted to the telescopic piece 30. The telescopic piece 30 absorbs the vibration through the elastic piece 34 therein, thereby reducing the vibration of the sleeve 10. The vibration is reduced when being transmitted to a hand holding the sleeve 10. In some embodiments, the vibrating piece 70 abuts against a middle position of the one end of the flexible piece 20 away from the second opening 15. In some other embodiments, the vibrating piece 70 abuts against other positions of the one end of the flexible piece 20 away from the second opening 15 except the middle position.

In one embodiment, the vibrating piece 70 is disposed in the telescopic piece 30 and disposed close to the flexible piece 20. For example, the vibrating piece 70 is disposed in a receiving cavity 325 of the telescopic piece 30. The vibrating piece 70 comprises a motor and an eccentric wheel. The motor is fixed on the telescopic piece 30. The eccentric wheel is driven by the motor to rotate to generate the vibration. Alternatively, the vibrating piece 70 may be disposed between the telescopic piece 30 and the flexible piece 20. In some embodiments, when the negative pressure is formed in the sleeve 10, the part of the flexible piece 20 disposed in the sleeve 10 is deformed, and the part of the flexible piece 20 moves toward the first opening 13. The vibrating piece 70 and the telescopic piece 30 are driven by the flexible piece 20 and move toward the first opening 13. That is, the flexible piece 20 is deformed and moves toward the first opening 13, and the vibrating piece 70 and the telescopic piece 30 connected to the vibrating piece 70 are driven to move toward the first opening 13.

In one embodiment, the telescopic piece 30 comprises a telescopic body 32 and an elastic piece 34. The telescopic body 32 is extendable and retractable in the axial direction of the sleeve. The elastic piece 34 is mounted on the telescopic body 32. The elastic piece 34 is elastically deformable when the telescopic body 32 is compressed.

The telescopic body 32 is compressed and deformed when driven by the flexible piece 20, and the elastic piece 34 mounted on the telescopic body 32 is also compressed to deform. The elastic piece 34 includes a coil spring, an elastic colloid, etc. In a compression process, the elastic piece 34 stores deformation potential energy. As the negative pressure generated by the negative pressure driving component 40 reduces or other situations occur, the elastic piece 34 releases the deformation potential energy, thereby driving the telescopic body 32 to extend in an opposite direction along the axial direction, so that the telescopic body 32 is restored to an extended state. In one embodiment, the elastic piece 34 is a spring made of a hard material, and the telescopic body 32 is made of a flexible material. A position of the elastic piece 34 is limited inside the telescopic body 32. The elastic piece 32 is configured to support the telescopic body 32 to prevent the telescopic body 32 from tilting. When both the elastic piece 34 and the telescopic body 32 are driven by the flexible piece 20 to move toward the first opening 13, the elastic piece 34 limits a movement direction of the telescopic body 32, so that the telescopic body 32 is stably compressed and deformed along the axial direction of the sleeve 10.

In one embodiment, the elastic piece 34 extends in the axial direction toward the second opening 15. A channel is defined in the elastic piece 34.

The elastic piece 34 includes an elastic body such as the spring or a hollow silicone structure. Specifically, when the vibrating piece 70 is driven by the flexible piece 20 that is deformed to move toward the first opening 13, the vibrating piece 70 is limited to move in the channel defined by the elastic piece 34. When the elastic piece 34 is in an extended state, at least a portion of the end of the vibrating piece 70 away from the flexible piece 20 is limited in the channel of the elastic piece 34. The vibrating piece 70 is movable in the channel along the axial direction of the sleeve 20 as a whole.

It is understood that the telescopic body 32 comprises two portions, a first portion thereof is disposed corresponding to the elastic piece 34, and a second portion thereof is configured to fix the vibrating piece 70.

In one embodiment, the telescopic piece 30 is detachably connected to the sleeve 10, that is, the telescopic piece 30 is able to be mounted in the sleeve 10 and is able to be taken out from the sleeve 10, so as to facilitate cleaning of the sleeve 10.

In one embodiment, the telescopic body 32 comprises convex rings 322 and connecting portions 324. Each of the connecting portions 324 is connected between corresponding two adjacent convex rings 322, and the connecting portions 324 are deformable to make the telescopic body 32 extend and retract.

Specifically, the telescopic body 32 adopts a structure in which the convex rings 322 and the connecting portions 324 are alternately disposed. The connecting portions 324 are flexible. The convex rings 322 are distributed at equal or unequal intervals. Under an action of an axial pressure, the connecting portions 324 are deformed, while the convex rings 322 maintain a stable shape, thereby limiting an overall compression displacement within a deformation range of the connecting portions 324. The convex rings 322 are relatively strong and not easily deformed, while the connecting portions 324 are relatively weak and easily deformed.

In one alternative embodiment, the telescopic body 32 comprises the convex rings 322 and the connecting portions 324. Each of the connecting portions 324 is connected between the corresponding two adjacent convex rings 322. The convex rings 322 and the connecting portions 324 are deformable to make the telescopic body 32 extend and retract.

Specifically, the convex rings 322 and the connecting portions 324 of the telescopic body 32 are capable of deformation. Under the action of the axial pressure, the convex rings 322 and the connecting portions 324 are deformed, and a coordinated deformation of the convex rings 322 and the connecting portions 324 improves a compression effect of the telescopic body 32. The convex rings 322 are made weak in strength in a variety of ways, so that both the convex rings 322 and the connecting portions 324 are deformable. For example, the convex rings 322 are made thinner to reduce the strength, or grooves or holes are opened on the convex rings 322 to reduce the strength. Alternatively, the convex rings 322 are made of a material with lower strength.

In one embodiment, an accommodating groove 321 is defined on a side wall of the telescopic body 32, and the accommodating groove 321 is a spiral accommodating groove 321. The elastic piece 34 is spiral and is disposed in the accommodating groove 321.

The telescopic body 32 defines the spiral accommodating groove 321 on the side wall thereof, and the elastic piece 34 is embedded in the accommodating groove 321. The spiral accommodating groove 321 provides an axial positioning reference for the elastic piece 34 through a continuous spiral track. When the telescopic body 32 is compressed and deformed, a groove wall of the spiral accommodating groove 321 contacts and limits the elastic piece 34 in three dimensions, thereby limiting a radial displacement of the elastic piece 34 while forcing the elastic piece 34 to produce axial compression deformation along the continuous spiral track. At this time, the elastic piece 34 stores the deformation potential energy through its own elastic properties. When the external compression force is released, the elastic piece 34 releases the deformation potential energy and drives the telescopic body 32 to reset in the opposite direction. Therefore, the telescopic body 32 and the elastic piece 34 form a two-way mechanical transmission. The compression deformation of the telescopic body 32 is converted into axial energy of the elastic piece 34, and a restoring force of the elastic piece 34 reacts to the telescopic body 32 to reset the telescopic body 32.

In one embodiment, in a direction from the second opening 15 to the first opening 13, a diameter of the sleeve 10 gradually decreases.

Specifically, the diameter of the sleeve 10 decreases continuously from the second opening 15 to the first opening 13, forming a tapered flow channel structure. Namely, the sleeve 10 is a tapered sleeve 10. A continuously decreasing diameter distribution of the sleeve 10 produces multiple technical effects. First, the tapered sleeve naturally fits a gripping curve of a human palm, forming an ergonomic gripping surface. Secondly, the diameter of the sleeve that is gradually reduced causes a cross-sectional area of the tapered flow channel structure to gradually decrease. When the negative pressure is formed, the tapered flow channel structure accelerates the airflow from the second opening 15 to the first opening 13 and enhances negative pressure transmission efficiency. Furthermore, the tapered flow channel structure guides and limits the deformation of the flexible piece 20 and the deformation of the telescopic piece 30 disposed inside the sleeve 10. When the flexible piece 20 and the telescopic piece 30 move toward the first opening 13, the tapered flow channel structure forces the flexible piece 20 to produce a composite deformation of radial compression and axial expansion.

In one embodiment, the portion of the flexible piece 20 is disposed inside the sleeve 10, and the other portion of the flexible piece 20 is disposed outside the sleeve 10. When the flexible piece 20 is connected to the sleeve 10, the flexible piece 20 closes the second opening 15. The sleeve 10 comprises an end wall 12 surrounding the second opening 15; and one end of the flexible piece 20 wraps the end wall 12 of the sleeve 10 and is partially disposed outside the sleeve 10.

Specifically, the sleeve 10 comprises the end wall 12 around the second opening 15, the end wall 12 of the sleeve is annular. The flexible piece 20 is sleeved on the end wall 12 of the sleeve 10 through a wrapping rim formed at one end thereof. Therefore, the flexible piece 20 is detachably wrapped and connected to the second opening. The flexible piece 20 is capable of closing the second opening 15. Optionally, an annular groove is defined on an inner side of the wrapping rim of the flexible piece 20 to form an interference fit with a protruding structure disposed on the end wall 12 of the sleeve 10, and the interference fit is realized through elastic deformation to form an airtight connection interface, thereby enhancing a connection strength between the flexible piece 20 and the sleeve 10. The flexible piece 20 is detachably connected to the end wall 12 of the sleeve 10, which allows the flexible piece 20 to be independently removed from the sleeve 10, so that the flexible piece 20 is allowed to be replaced, cleaned, and maintained.

In one alternative embodiment, the wrapping rim is disposed on the end wall of the sleeve 10, and the protruding structure is disposed on the flexible piece 20. Therefore, the connection strength of the sleeve 10 with one end of the flexible piece 20 is improved, and the flexible piece 20 is prevented from being easily separated from the sleeve 10.

The other portion of the flexible piece 20 disposed outside the sleeve 10 is extended along the axial direction of the sleeve 10 and toward the negative pressure driving component 40, thereby further enhancing the connection strength with the sleeve 10. Moreover, because the flexible piece 20 is relatively soft, the flexible piece 20 further prevents a hard end of the sleeve 10 from hitting an external object (such as the fingers of the user).

The other end of the flexible piece 20 is adjacent to or close to the telescopic piece 30. The other end of the flexible piece 20 is disposed to be adjacent to or close to the telescopic piece 30. When the negative pressure driving component 40 is not working, there is a gap between the flexible piece 20 and the telescopic piece 30. Namely, the flexible piece 20 does not contact the telescopic piece 30. When the negative pressure driving component 40 works, the flexible piece 20 deforms in the axial direction under the negative pressure to contact and act on the telescopic piece 30, forming a continuous force transmission path, so that the deformation of the flexible piece 20 is directly converted into a driving displacement of the telescopic piece 30. When the negative pressure driving component 40 stops working, the telescopic piece 30 is reset by the elastic piece 34 disposed therein, and the telescopic piece 30 is driven to reset in the axial direction, so that the telescopic piece 30 promotes the flexible piece 20 to rebound. In other embodiments, when the negative pressure driving component 40 is not working, the flexible piece 20 contacts the telescopic piece 30.

In one embodiment, the male masturbator 1 further comprises a base 50. The negative pressure driving component 40 is mounted on the base 50. The base 50 comprises an inner shell 52 and an outer shell 54. The inner shell 52 is sleeved in the outer shell 54. The sleeve 10 is partially disposed between the inner shell 52 and the outer shell 54.

The outer shell 54 of the base 50 of the male masturbator 1 is sleeved outside the inner shell 52 to form a protective shell to realize mechanical protection. The sleeve 10 is partially disposed in a space between the inner shell 52 and the outer shell 54. That is, the sleeve is sandwiched by the inner shell 52 and the outer shell 54.

In one embodiment, the base 50 further comprises a bottom shell 56. The bottom shell 56 seals a first end of the outer shell 54, the inner shell 52 seals a second end of the outer shell 54. The negative pressure driving component 40 is disposed in the outer shell 54.

The base 50 is assembled by different shell structures. The outer shell 54 serves as a main support body and defines a mounting cavity extending in the axial direction. The bottom shell 56 and the inner shell 52 are respectively fixed to axial ends of the outer shell 54 in a sealed manner, thereby forming a closed protective space. The negative pressure driving component 40 is disposed inside the mounting cavity of the outer shell 54 and forms a stable assembly relationship with the outer shell 54 through positioning structures of the inner shell 52. The outer shell 54 is sealed by the inner shell 52 and the bottom shell 56, which ensures the airtightness of the negative pressure driving component 40 disposed in the outer shell 54. In some embodiments, an air outlet is defined on one end of the bottom shell 56 away from the flexible piece 20, and the negative pressure driving component 40 extracts the gas in the sleeve 10 and discharges the gas from the air outlet, so that the negative pressure is formed in the sleeve 10.

Figure 5:
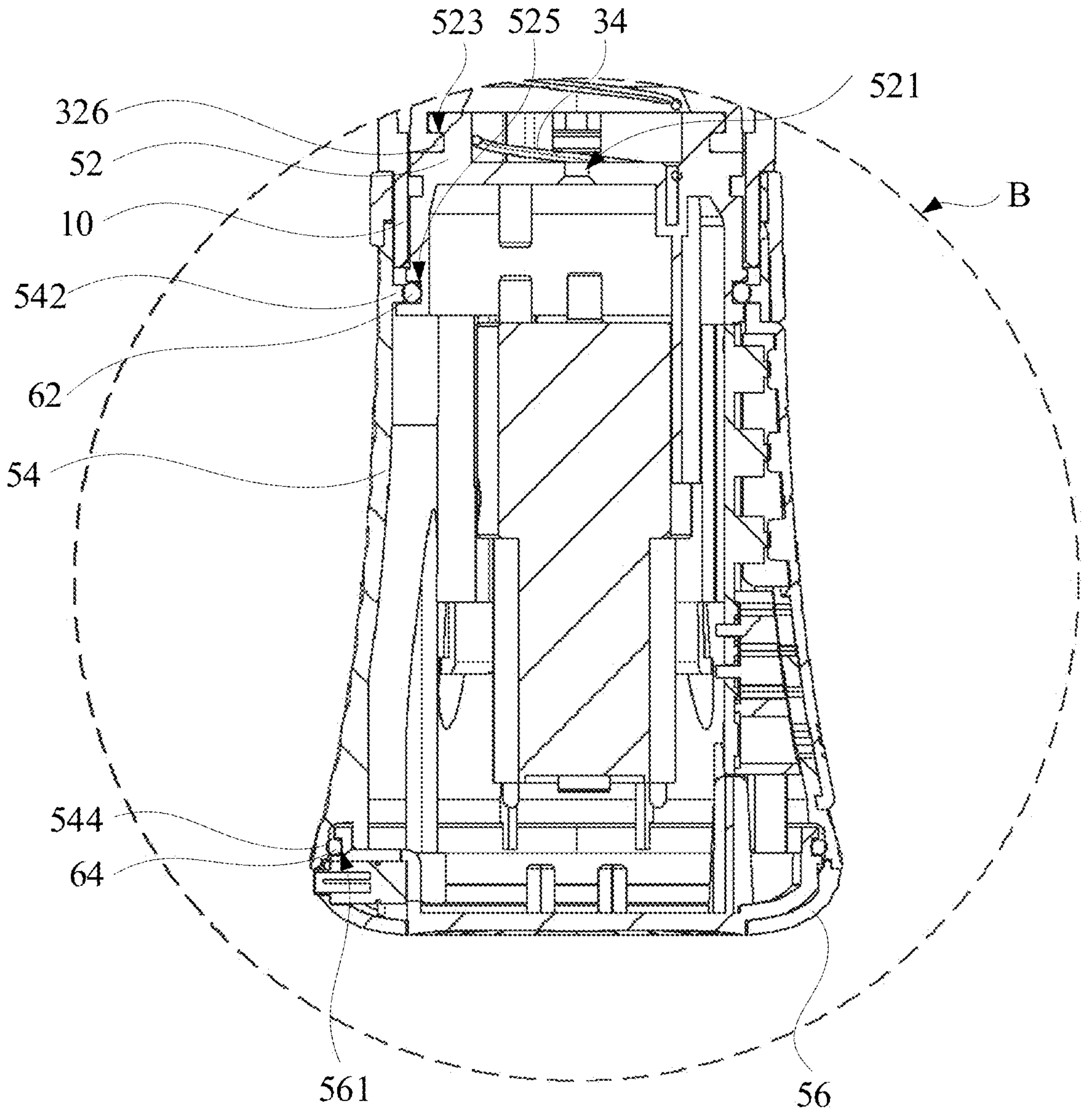
FIG. 5 is an enlarged schematic diagram of portion B shown in FIG. 4.

FIG. 5 is an enlarged schematic diagram of portion A shown in FIG. 4. As shown in FIG. 5, the telescopic body 32 is hollow to define the receiving cavity 325 therein. One end of the telescopic body 32 away from the flexible piece 20 is connected to the inner shell 52. The outer shell 54 is sealed with the inner shell 52. The inner shell 52 is sealed with the telescopic body 32. The inner shell 52 defines a communicating hole communicated with the receiving cavity 325.

In the embodiment, the inner shell 52 forms a through airflow passage with the hollow area 325 of the telescopic body 32 through the communicating hole 521. The outer shell 54 seals the inner shell 52 to configure as an outer protective barrier. Meanwhile, the sealed connection between the inner shell 52 and the telescopic body 32 constitutes an internal airtight cavity, so that the negative pressure generated by the negative pressure driving component is efficiently transmitted to the interior of the telescopic body 32 through the communicating hole 521.

In one embodiment, a limiting groove 523 is defined on one end of the inner shell 52 facing the telescopic body 32. A clamping portion 326 is disposed on one end of the telescopic body 32 facing the inner shell 52. The clamping portion 326 is clamped in the limiting groove 523.

When mounting the telescopic body 32, the clamping portion 326 is embedded in the limiting groove 523, which automatically realizes an axial alignment, so that the telescopic body 32 is tightly connected to the inner shell 52 without additional adjustment. When the telescopic body 32 moves, the limiting groove 523 prevents the radial displacement of the telescopic body 32, avoiding friction loss caused by deviation of a movement path, thereby ensuring that the telescopic body 32 is stably extended and retracted along the axial direction, and facilitating assembly and disassembly.

In one embodiment, the male masturbator 1 further comprises a first sealing ring 62, and the first sealing ring 62 is disposed between the inner shell 52 and the outer shell 54 to seal and connect the inner shell 52 and the outer shell 54.

The first sealing ring 62 is disposed between the inner shell 52 and the outer shell 54. The first sealing ring 62 is made of an elastic material to fill an assembly gap between the inner shell and the outer shell 54, thereby maintaining a stable connection between the inner shell 52 and the outer shell 54, preventing loosening of the inner shell 52 and the outer shell 54 caused by vibration or temperature changes, and ensuring the air tightness and liquid tightness of the stable connection between the outer shell 54 and the inner shell 52. The first sealing ring 62 not only blocks an invasion of external environmental pollutants and isolates damage to internal components of the male masturbator 1 due to dust, moisture, etc., but also helps to create the through airflow passage for the negative pressure driving component. Thus, the negative pressure driving component is not disturbed by external airflow during normal operation, thereby ensuring overall performance and durability of the male masturbator 1.

In one embodiment, a first accommodating groove 525 is defined on a side wall of the inner shell 52 facing the outer shell 54, and the first sealing ring 62 is disposed in the first accommodating groove 525. The outer shell 54 comprises a first protruding portion 542 protruding toward the first sealing ring 62, and the first protruding portion 542 abuts against the first sealing ring 62.

The side wall of the inner shell 52 defines the first accommodating groove 525, so that the first sealing ring 62 is accurately embedded in the first accommodating groove 525 for positioning. The first protruding portion 542 protruding from the outer shell 54 abuts against the first sealing ring 62, so that the first sealing ring 62 undergoes elastic deformation, and the first sealing ring 62 is deformed to simultaneously fill an assembly gap between the first accommodating groove 525 and the first protruding portion 542. Further, the first sealing ring 62 is axially fixed in the first accommodating groove 525 to avoid displacement, and the first sealing ring 62 is radially subjected to a continuous compression force from the first protruding portion 542 to maintain the sealing effect, thereby achieving long-term stable environmental isolation and airtightness assurance.

In one embodiment, a second accommodating groove 561 is defined on a side wall of the bottom shell 56 facing the outer shell 54, and a second sealing ring 64 is disposed in the second accommodating groove 561. The second sealing ring 64 is disposed between the bottom shell 56 and the outer shell 54. The outer shell 54 comprises a second protruding portion 544 protruding toward the second sealing ring 64, and the second protruding portion 544 abuts against the second sealing ring 64.

The second accommodating groove 561 is defined on the side wall of the bottom shell 56, and the second accommodating groove 561 is configured to mount the second sealing ring 64. The second sealing ring 64 is accurately embedded in the second accommodating groove 561 for positioning. The second protruding portion 544 is disposed at a position of the outer shell 54 corresponding to the second sealing ring 64. During assembly, the second protruding portion 544 abuts against the second sealing ring 64, and the second sealing ring 64 simultaneously fills an assembly gap between the second accommodating groove 561 and the second protruding portion 544, so that the second sealing ring 64 is axially fixed in the second accommodating groove 561 to avoid displacement, and the second sealing ring 64 is radially subjected to a continuous pressing force of the second protruding portion 544 to maintain the sealing effect. Even when vibration or temperature difference changes, the second sealing ring 64 still maintains the sealing effect, realizes long-term stable environmental isolation and airtightness guarantee, and ensures the normal operation of the negative pressure driving component. Therefore, the negative pressure driving component is not disturbed by external airflow, thereby improving the performance and reliability of the male masturbator 1 and extending the service life of the male masturbator 1.

In one embodiment, when both the telescopic piece 30 and the flexible piece 20 are not deformed, along the axial direction of the sleeve 10, a length of the telescopic piece 30 is not less than a length of the flexible piece 20. Therefore, the telescopic piece 30 is allowed to be fully deformed, which helps the movement coordination between the telescopic piece 30 and the flexible piece 20, making the massage action of the male masturbator 1 smoother and more natural, and improving the user experience.

A first space 21 is defined in the flexible piece 20, and a third opening 23 communicated with the first space 21 is defined on one end of the flexible piece 20 away from the telescopic piece 30, and the third opening 23 is configured for an external object (such as the human fingers or the penis) to enter and exit the first space 21.

The third opening 23 is an interactive interface between an outside world and the flexible piece 20. The user is able to put his penis into or take his penis out the first space 21 through the third opening 23. When the negative pressure driving component 40 is working, the flexible piece 20 contracts inward in the sleeve 10 under the action of the pressure difference, so that a volume of the first space 21 is reduced, thereby the flexible piece 20 wraps and sucks the penis in the first space 21. When the negative pressure gradually decreases, the flexible piece 20 returns to the initial state under its own elasticity, and the volume of the first space 21 is restored accordingly, so that the penis is able to exit the first space 21. In some embodiments, the negative pressure changes periodically, and the flexible piece 20 contracts and rebounds alternately. In a contraction stage, the volume of the first space 21 decreases, generating a suction force, forming a wrapping and sucking effect on the penis. In a rebound stage, the volume of the first space 21 is restored, the suction force is released, and a slight pushing force is released at the same time. The flexible piece 20 is contracted and rebounded repeatedly to complete a massage cycle, thereby achieving a massage effect on the penis.

In one embodiment, protrusions are disposed around an inner wall of the flexible piece 20. The protrusions increase a tightness between the flexible piece 20 and the penis and are further configured to massage the penis. The protrusions are selected from spherical protrusions, annular protrusions, strip protrusions, etc. In some examples, the protrusions are selected from any combination of the spherical protrusions, the annular protrusions, the strip protrusions, etc., and the protrusions are sequentially disposed along the axial direction.

In one embodiment, the male masturbator 1 further comprises a circuit board 80. At least one of a switch, a gear adjustment piece, and a gear display is disposed on the circuit board 80. The switch is configured to control start and stop of the negative pressure driving component 40. The gear adjustment piece is configured to control the different gears of the negative pressure driving component 40. The gear display is configured to display a current gear of the negative pressure driving component 40 by displaying lights of different colors, displaying a corresponding number indicating the current gear of the negative pressure driving component 40, or etc.

In one embodiment, the circuit board 80 is further configured to control the vibrating piece. For example, the circuit board 80 is further configured to control start and stop of the vibrating piece, a current gear of the vibrating piece, etc. The circuit board 80 is further configured to display the current gear of the vibrating piece by displaying lights of different colors, displaying a corresponding number indicating the current gear of the vibrating piece, etc.

In one embodiment, the male masturbator 1 further comprises a power supply piece 90, which may be a battery. The battery is configured to supply power to components in the male masturbator 1, such as the negative pressure driving component 40, the circuit board 80, the vibrating piece 70, etc. The battery provides power for the male masturbator 1, so as to facilitate carrying and use of the male masturbator 1. In some embodiments, the power supply piece 90 is a power circuit connected to an external power source, and the power circuit supplies power to the components in the male masturbator 1, such as the negative pressure driving component 40, the circuit board 80, the vibrating piece 70, etc. In some embodiments, the circuit board of the male masturbator 1 further comprises a power display component configured to display a battery power by displaying different numbers of display lights, different colors or brightness of the display lights, or different flashing frequencies of the display lights.

In one embodiment, the male masturbator 1 further comprises a charging interface for charging the battery. The battery is charged through the charging interface, and the male masturbator 1 is able to be directly driven through the charging interface. The charging interface is configured as needed. For example, the charging interface is a USB interface, a TYPE-C interface, or etc. The present disclosure does not limit a specific type of the charging interface, as long as the charging interface is capable of charging the battery or supplying power to the male masturbator 1. In some other embodiments, the male masturbator 1 does not have the charging interface, but the battery is charged by wireless charging to improve waterproof performance of the male masturbator 1. A wireless charging method is realized by providing a wireless charging circuit in the male masturbator 1. In some other embodiments, the male masturbator 1 does not have the charging interface and is unable to be wirelessly charged, but a battery replacement method is adopted. Of course, in some embodiments, the male masturbator 1 adopts at least two power supply methods of charging through the charging interface, the wireless charging method, and the battery replacement method.

In one embodiment, the circuit board 80 is electrically connected to the negative pressure driving component 40 and the vibrating piece 70. The circuit board 80 is configured to control a working state of the negative pressure driving component 40 and a working state of the vibrating piece 70.

In one embodiment, when the circuit board 80 receives a first control instruction, the circuit board 80 controls the negative pressure driving component 40 to extract the gas in the sleeve 10 to form the negative pressure in the sleeve 10, so as to directly drive the flexible piece 20 to move toward the first opening 13, indirectly drive the telescopic piece 30 to move toward the first opening 13 through the flexible piece 20, and control the vibrating piece 70 to be in the non-vibration state. The circuit board 80 is configured to receive control instructions such as the first control instruction through a button disposed thereon, or the circuit board 80 is configured to receive the control instructions through a wireless communication circuit (such as a BLUETOOTH communication circuit or a WIFI communication circuit, etc.) disposed thereon, or the circuit board 80 is configured to receive the control instructions through other circuits (such as a voice recognition circuit, a touch recognition circuit, etc.) disposed thereon.

In one embodiment, when the circuit board 80 receives a second control instruction, the circuit board 80 controls the vibrating piece 70 to vibrate and controls the negative pressure driving component 40 to be in the non-working state. At this time, the vibrating piece 70 is connected to and acts on the one end of the flexible piece 20 away from the second opening 15. The circuit board 80 is able to receive the control instructions such as the second control instruction through the button, the wireless communication circuit or other circuits disposed thereon.

In one embodiment, when the circuit board 80 receives a third control instruction, the circuit board 80 controls the negative pressure driving component 40 to extract the gas in the sleeve 10 to form the negative pressure in the sleeve 10, and controls the vibrating piece 70 to vibrate in a predetermined time period after the extraction action is performed. The circuit board 80 is able to receive the control instructions such as the third control instruction through the button, the wireless communication circuit or the other circuits disposed thereon.

In one embodiment, the male masturbator 1 further comprises a flexible outer cover. The flexible outer cover covers the circuit board 80 and is sealed with the outer shell 54 to play a protective and sealing role.

The above are optional embodiments of the present disclosure, and the protection scope of the present disclosure is not limited by the specific embodiments mentioned above.

What is claimed is:

1. A male masturbator, comprising:

a sleeve;

a flexible piece;

a telescopic piece; and a negative pressure driving component;

wherein the sleeve defines an accommodating space, a first opening, and a second opening, the first opening and the second opening are defined on two opposite ends of the sleeve along an axial direction thereof, and the first opening and the second opening are communicated with the accommodating space;

wherein the flexible piece is at least partially disposed in the accommodating space, the telescopic piece is at least partially disposed in the accommodating space, and the flexible piece and the telescopic piece are disposed in sequence along the axial direction of the sleeve and toward the second opening, wherein the telescopic piece comprises a telescopic body and an elastic piece, the telescopic body is extendable and retractable in the axial direction of the sleeve, the elastic piece is mounted on the telescopic body, and the elastic piece is elastically deformable when the telescopic body is compressed;

wherein the negative pressure driving component is communicated with the first opening of the sleeve and enables a negative pressure to be formed in the sleeve, so that the flexible piece is driven to move toward the first opening and the telescopic piece is driven to move toward the first opening;

wherein the male masturbator further comprises a vibrating piece disposed in the accommodating space and connected to the telescopic piece, wherein when the negative pressure is formed in the sleeve, the vibrating piece abuts against one end of the flexible piece away from the second opening, and the vibrating piece is configured to generate vibration and act on the one end of the flexible piece away from the second opening;

wherein the male masturbator further comprises a base, the negative pressure driving component is mounted on the base, the base comprises an inner shell and an outer shell, the inner shell is sleeved in the outer shell, and the sleeve is partially disposed between the inner shell and the outer shell;

wherein the base further comprises a bottom shell, the bottom shell seals a first end of the outer shell, the inner shell seals a second end of the outer shell, and the negative pressure driving component is disposed in the outer shell;

wherein the telescopic body is hollow to define a receiving cavity therein, and one end of the telescopic body away from the flexible piece is connected to the inner shell, the outer shell is sealed with the inner shell, the inner shell is sealed with the telescopic body, and the inner shell defines a communicating hole communicated with the receiving cavity.

2. The male masturbator according to claim 1, wherein when the negative pressure is formed in the sleeve, the vibrating piece and the telescopic piece are driven by the flexible piece to move toward the first opening.

3. The male masturbator according to claim 1, wherein the elastic piece extends in the axial direction toward the second opening, a channel is defined in the elastic piece, and the vibrating piece is disposed in the channel and vibrates in the channel.

4. The male masturbator according to claim 1, wherein the telescopic body comprises convex rings and connecting portions, each of the connecting portions is connected between corresponding two adjacent convex rings, and the connecting portions are deformable to make the telescopic body extend and retract.

5. The male masturbator according to claim 1, wherein the telescopic body comprises convex rings and connecting portions, each of the connecting portions is connected between corresponding two adjacent convex rings, and the convex rings and the connecting portions are deformable to make the telescopic body extend and retract.

6. The male masturbator according to claim 1, wherein a limiting groove is defined on one end of the inner shell facing the telescopic body, a clamping portion is disposed on one end of the telescopic body facing the inner shell, and the clamping portion is clamped in the limiting groove.

7. The male masturbator according to claim 6, wherein the one end of the inner shell facing the telescopic body comprises an outer side facing the sleeve, and the limiting groove is defined on the outer side of the inner shell;

wherein the one end of the telescopic body facing the inner shell is sleeved on the inner shell, and the clamping portion of the telescopic body is clamped in the limiting groove.

8. The male masturbator according to claim 1, wherein the male masturbator further comprises a first sealing ring, and the first sealing ring is disposed between the inner shell and the outer shell to seal and connect the inner shell and the outer shell.

9. The male masturbator according to claim 8, wherein a first accommodating groove is defined on a side wall of the inner shell facing the outer shell, and the first sealing ring is disposed in the first accommodating groove;

wherein the outer shell comprises a first protruding portion protruding toward the first sealing ring, and the first protruding portion abuts against the first sealing ring.

10. The male masturbator according to claim 1, wherein the male masturbator further comprises a second sealing ring, and the second sealing ring is disposed between the bottom shell and the outer shell to seal and connect the bottom shell and the outer shell.

11. The male masturbator according to claim 10, wherein a second accommodating groove is defined on a side wall of the bottom shell facing the outer shell, and the second sealing ring is disposed in the second accommodating groove;

whereon the outer shell comprises a second protruding portion protruding toward the second sealing ring, and the second protruding portion abuts against the second sealing ring.

12. The male masturbator according to claim 1, wherein in a direction from the second opening to the first opening, a diameter of the sleeve gradually decreases.

13. The male masturbator according to claim 1, wherein the sleeve comprises an end wall surrounding the second opening; and one end of the flexible piece wraps the end wall of the sleeve and is partially disposed outside the sleeve.

14. The male masturbator according to claim 1, wherein when both the telescopic piece and the flexible piece are not deformed, along the axial direction of the sleeve, a length of the telescopic piece is not less than a length of the flexible piece.

15. A male masturbator, comprising:

a sleeve;

a flexible piece;

a telescopic piece; and a negative pressure driving component;

wherein the sleeve defines an accommodating space, a first opening, and a second opening, the first opening and the second opening are defined on two opposite ends of the sleeve along an axial direction thereof, and the first opening and the second opening are communicated with the accommodating space;

wherein the flexible piece is at least partially disposed in the accommodating space, the telescopic piece is at least partially disposed in the accommodating space, and the flexible piece and the telescopic piece are disposed in sequence along the axial direction of the sleeve and toward the second opening, wherein the telescopic piece comprises a telescopic body and an elastic piece, the telescopic body is extendable and retractable in the axial direction of the sleeve, the elastic piece is mounted on the telescopic body, and the elastic piece is elastically deformable when the telescopic body is compressed;

wherein the negative pressure driving component is communicated with the first opening of the sleeve and enables a negative pressure to be formed in the sleeve, so that the flexible piece is driven to move toward the first opening and the telescopic piece is driven to move toward the first opening;

wherein the male masturbator further comprises a base, the negative pressure driving component is mounted on the base, the base comprises an inner shell and an outer shell, the inner shell is sleeved in the outer shell, and the sleeve is partially disposed between the inner shell and the outer shell;

wherein the base further comprises a bottom shell, the bottom shell seals a first end of the outer shell, the inner shell seals a second end of the outer shell, and the negative pressure driving component is disposed in the outer shell;

wherein the telescopic body is hollow to define a receiving cavity therein, and one end of the telescopic body away from the flexible piece is connected to the inner shell, the outer shell is sealed with the inner shell, the inner shell is sealed with the telescopic body, and the inner shell defines a communicating hole communicated with the receiving cavity.

* * * * *